United States Patent
Lu

Patent Number: 5,109,864
Date of Patent: May 5, 1992

[54] NIPPLE ASSEMBLY WITH ALARM BUZZER AND BODY TEMPERATURE INDICATOR (IV)

[76] Inventor: Jieh-Shan Lu, 56, Alley 115, Shing Her Lane, Jang Her Li, Nan Tour City, Nan Tour County, Taiwan

[21] Appl. No.: 633,611

[22] Filed: Dec. 21, 1990

[51] Int. Cl.$^5$ .............................................. A61B 5/00
[52] U.S. Cl. ................................... 128/736; 606/234; 374/151
[58] Field of Search ........................ 128/736; 606/234; 374/151

[56] References Cited

U.S. PATENT DOCUMENTS

| | | | |
|---|---|---|---|
| 3,913,402 | 10/1975 | Doyle | 128/736 |
| 4,511,265 | 4/1985 | Berndt | 128/736 |
| 4,856,519 | 8/1989 | Teves | 606/234 |

FOREIGN PATENT DOCUMENTS

| | | | |
|---|---|---|---|
| 0166069 | 1/1986 | European Pat. Off. | 374/151 |
| 2346699 | 10/1977 | France | 128/736 |
| 2163855 | 3/1986 | United Kingdom | 128/736 |
| 8302644 | 8/1983 | World Int. Prop. O. | 128/736 |

*Primary Examiner*—Max Hindenburg
*Attorney, Agent, or Firm*—Bacon & Thomas

[57] ABSTRACT

Disclosed is a nipple assembly with an alarm buzzer and a body temperature indicator. The assembly comprises a nipple base in which is accommodated a main case. A protection housing is adhered to the main case by a waterproof glue therein. A heat sensitive resistor is provided in the protective housing. An IC board is electrically connected with the heat sensitive resistor, an LCD, and an alarm buzzer. A heat conductive liquid is filled in the sealed space defined by the base, the main case, and the protection housing. At the rear end of the base is attached a transparent convex housing to which is fastened a handle with a battery. When a baby sucks the nipple of the assembly, the heat in the baby's mouth can be transferred through the liquid to the heat sensitive resistor so that a signal can be sent through the IC board to the LCD for displaying the temperature. Moreover, when the baby's body temperature reaches a predetermined warning value, a signal from a heat sensitive resistor will be sent to the buzzer so that the latter can issue an alarming sound.

1 Claim, 4 Drawing Sheets

NIPPLE ASSEMBLY WITH ALARM BUZZER AND BODY TEMPERATURE INDICATOR (IV)

BACKGROUND OF THE INVENTION

This invention relates to a nipple assembly, specifically a nipple assembly with an alarm buzzer and a body temperature indicator. Within this assembly is provided a liquid of good heat conductivity, such as distilled clean water, for transferring the heat from a baby's mouth to a heat sensitive resistor which in turn sends a signal through an IC board to an LCD for displaying the baby's temperature. Moreover, when the baby's body temperature exceeds a predetermined upper limit, the heat sensitive resistor sends a signal to the alarm buzzer so that the buzzer is actucated to issue an alarming sound. Thereby, the body temperature of the baby sucking the nipple of the assembly in accordance with the invention can be monitored to protect the baby from being harmed by overhigh body temperature which can induce other aftersymptoms or even cause a whole-life regret.

Small families are the primary constituting units of the modern society in which babies are usually cared for by young busy inexperienced parents or even by the person working for a day nursery. In these circumstances, the babies' body temperatures are often neglected by their parents or the person who takes care of them. Especially in a day nursery, it is hard for the person who take care of the babies to know which baby is getting an overhigh temperature because he cannot let every baby to put a thermometer in his mouth all the time. This commonly existing problem in the modern society constitutes a potential risk to the babies' health and lives.

Accordingly, the primary object of the invention is to provide a nipple with a body temperature indicator of the electronic type for a baby's daily suction, in which the nipple is sealedly filled with distilled clean water or any other appropriate liquid through which the heat from the baby's mouth can be transferred to a heat sensitive resistor which then sends a signal to an LCD for displaying the baby's temperature so that the baby's parents or the person who cares for the baby can clearly observe the fluctuation in the baby's body temperature.

Another object of the invention is to provide a nipple assembly with an alarm buzzer, in which assembly is provided a heat sensitive resistor in connection with the buzzer through an IC so that the buzzer will be energized and issue an alarming sound when the temperature of the liquid in the nipple assembly reaches a warning point.

BRIEF SUMMARY OF THE INVENTION

To achieve these objects, provided in accordance with the present invention is a nipple assembly with an alarm buzzer and a body temperature indicator consisting of a nipple base, a main case, an IC board, an LCD, a heat sensitive resistor, an alarm buzzer, a decoration plate, a transparent convex cover, a handle provided with a battery therein.

The main case is in the form of a pot-shaped hard thin shell with a central hole. At the open end of the pot is provided an inwardly extending circular flange. On the outer circumference of the case is provided a plurality of glue pits for accommodating a waterproof glue for attaching the main case to the nipple base. The central hole is formed by a cylinder projecting from the main case, and the outer end of the cylinder is formed with a flange. A heat sensitive resistor is accommodated in a protection housing. The diameter of the protection housing is selected so that it can be exactly fitted into the central hole and adhered to the cylinder by a waterproof glue. A rubber sheet is adhered to said protection housing and the flange. An LCD is provided in the main case and is connected with the IC board through a conductive rubber. A decoration plate in the form of a web or a porous plate is adhered to the open end of the main case. The decoration plate is also formed with a rectangular viewing window through which the LCD can be protruded.

A heat conductive liquid is filled in the sealed space defined by the main case, the protection housing, the rubber sheet, and the base so that when a baby sucks the nipple attached to the base, the heat in the baby's mouth can be transferred through the liquid to the heat sensitive resistor immersed in the liquid, and then the resistor sends a signal representing the temperature of the liquid to said IC board which in turn causes the LCD to display the baby's body temperature. Moreover, when the heat coductive liquid reaches a predetermined warning temperature, a signal from the heat sensitive resistor will be sent through the IC board to the alarm buzzer.

BRIEF DESCRIPTION OF THE DRAWINGS

A preferred embodiment of the invention will now be described by way of example and with reference to the accompanying drawings, in which.

DETAILED DESCRIPTION OF THE INVENTION

Figure 1:
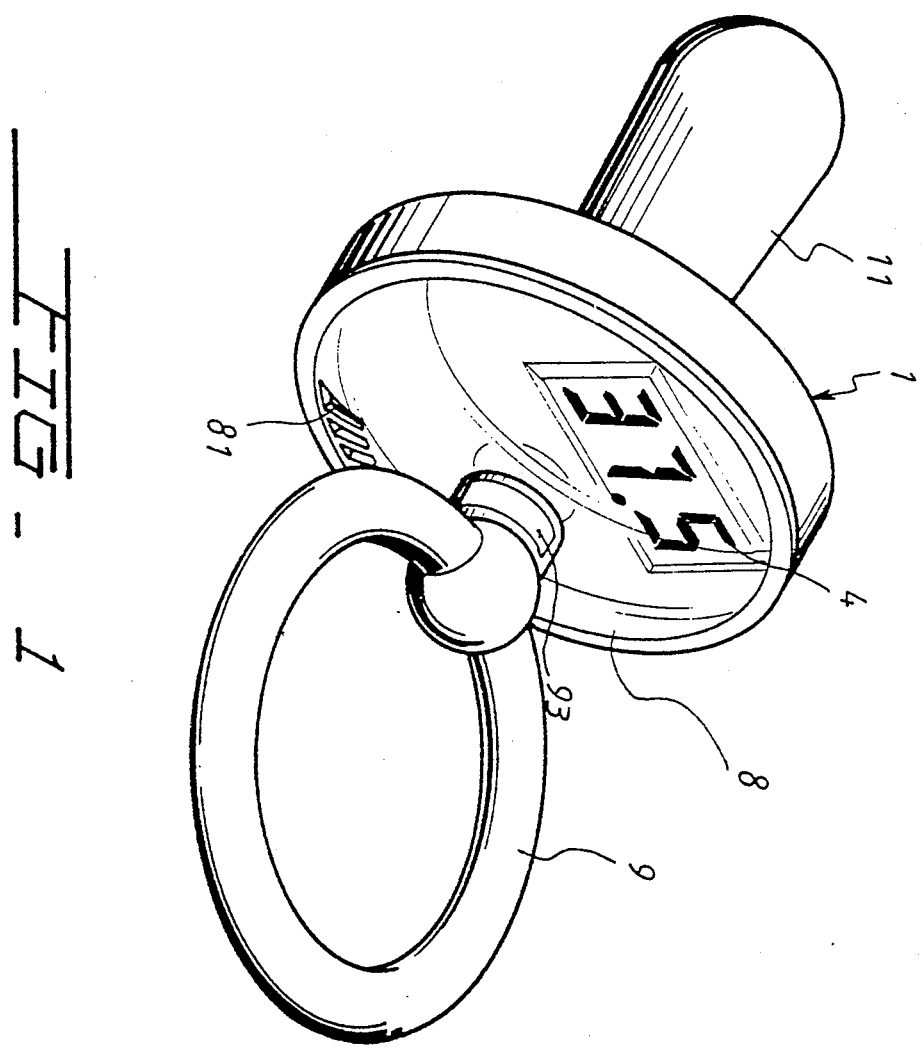
FIG. 1 is an outside view of a nipple assembly in accordance with the invention.

Referring to FIG. 1 which is an outside view of a nipple assembly in accordance with the invention, a person who faces the baby sucking the nipple can clearly read the body temperature indicated by the LCD through the magnification effects of a transparent convex housing 8 mounted on the back of the base 1. Moreover, a plurality of sound releasing openings 81 is provided in the housing 8. When the baby's body temperature reaches a predetermined warning point, a heat sensitive resistor 62 in the nipple assemble will become operative and consequently a buzzer 7 will issue an alarming sound through the openings 81 in the convex housing 8.

Figure 2:
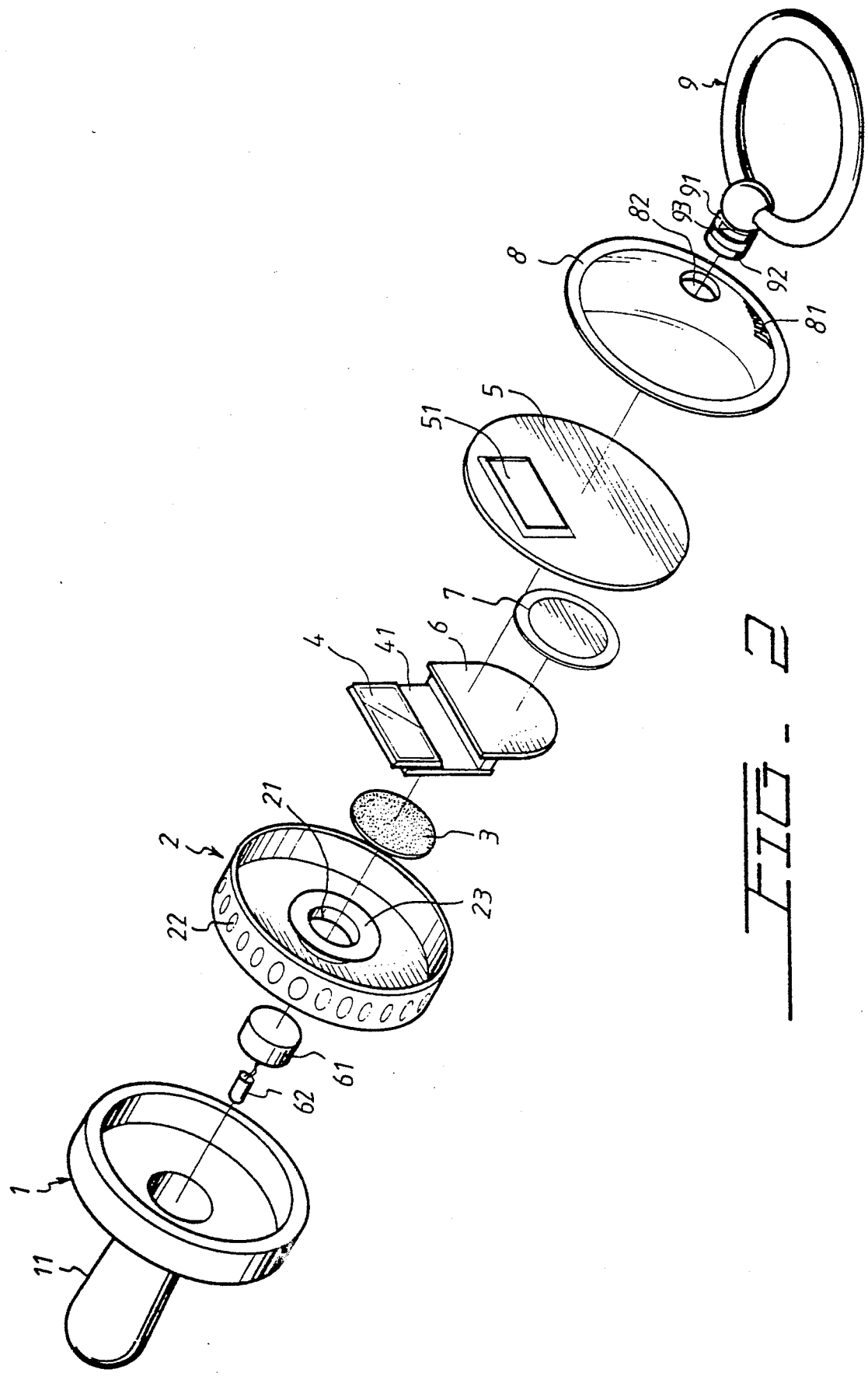
FIG. 2 is an exploded pictorial view showing the nipple assembly in accordance with the invention.
Figure 3:
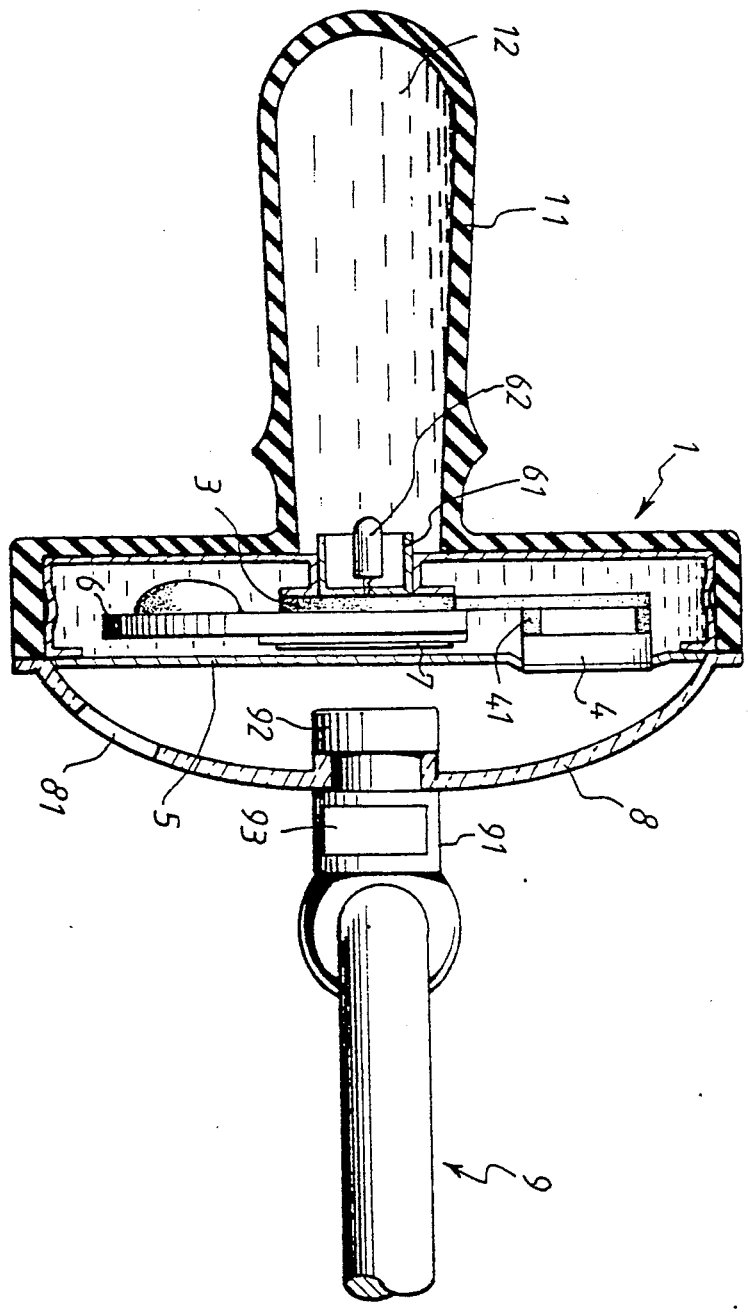
FIG. 3 is a sectional view showing the assembly in its assembled state.

Referring to FIGS. 2 and 3, the nipple assembly comprises the following primary elements listed in accordance with its disassembling order: a base 1 with a nipple 11, a main case 2, and an inner case. The base 1 is made of a pliable material of high density and has an opening on one side for receiving the main case 2 which is formed as a disk-shaped thin shell with a central hole 21. On the circumference of the main case 2 is provided a plurality of glue pits 22 for accommodating a waterproof glue by which the main case 2 can be adhered to the base 1. The central hole 21 is formed by a cylinder projecting from the main case. The outer end of the cylinder is formed with a flange 23. A heat sensitive resistor 62 is accommodated in a protection housing 61. The diameter of the housing is suitably selected so that it can be exactly fitted into the central hole 21 and adhered to the cylinder by a glue. In addition, a rubber sheet 3 is also adhered to the flange 23 so that a sealed space is defined between the main case 2, the protection housing 6, the rubber sheet 3, and the base 1.

An IC board 6 is provided in the main case 2. The power required by the IC board 6 is supplied by the battery 93 received in the handle 9. The IC board is connected in series with an LCD 4, an alarm buzzer 7, and the heat sensitive resistor 62. A decoration plate 5 is adhered to the open end of the main case 2. The decoration plate 5 consists of a web or a circular porous plate and is adhered to the main case 2 together with the IC board 6, the LCD 4, and the alarm buzzer 7. The decoration plate is also formed with a rectangular viewing window 51 so that the LCD can be viewed from outside.

A transparent convex housing 8 is adhered to the rear end of the base 1 to enclose the above-mentioned components between the housing 8 and the base 1. The housing 8 is made of a transparent material and is formed into a covex disk shape so that it has a magnification function. The convex disk is formed with a connection opening 82 at the center thereof and is also formed with a plurality of sound releasing openings 81 near its circumference. A connection base 92 is fitted in the opening 82. The numerals which can be read through the window 5 are magnified by the transparent convex housing 8.

The handle 9 can be formed in a ring or any other appropriate shape for holding by hand and is made of a pliable emulsion colloid. The handle 9 is attached with a battery seat 91. A mercury battery or any other small battery 93 can be disposed within the seat 91. Adjacent the seat 91 is a connection base 92 which can be pressed and retained in the opening 82. The battery 93 supplies the electric energy required by the IC board 6, the heat sensitive resistor 62, the alarm buzzer 7, and the LCD 4.

Figure 4:
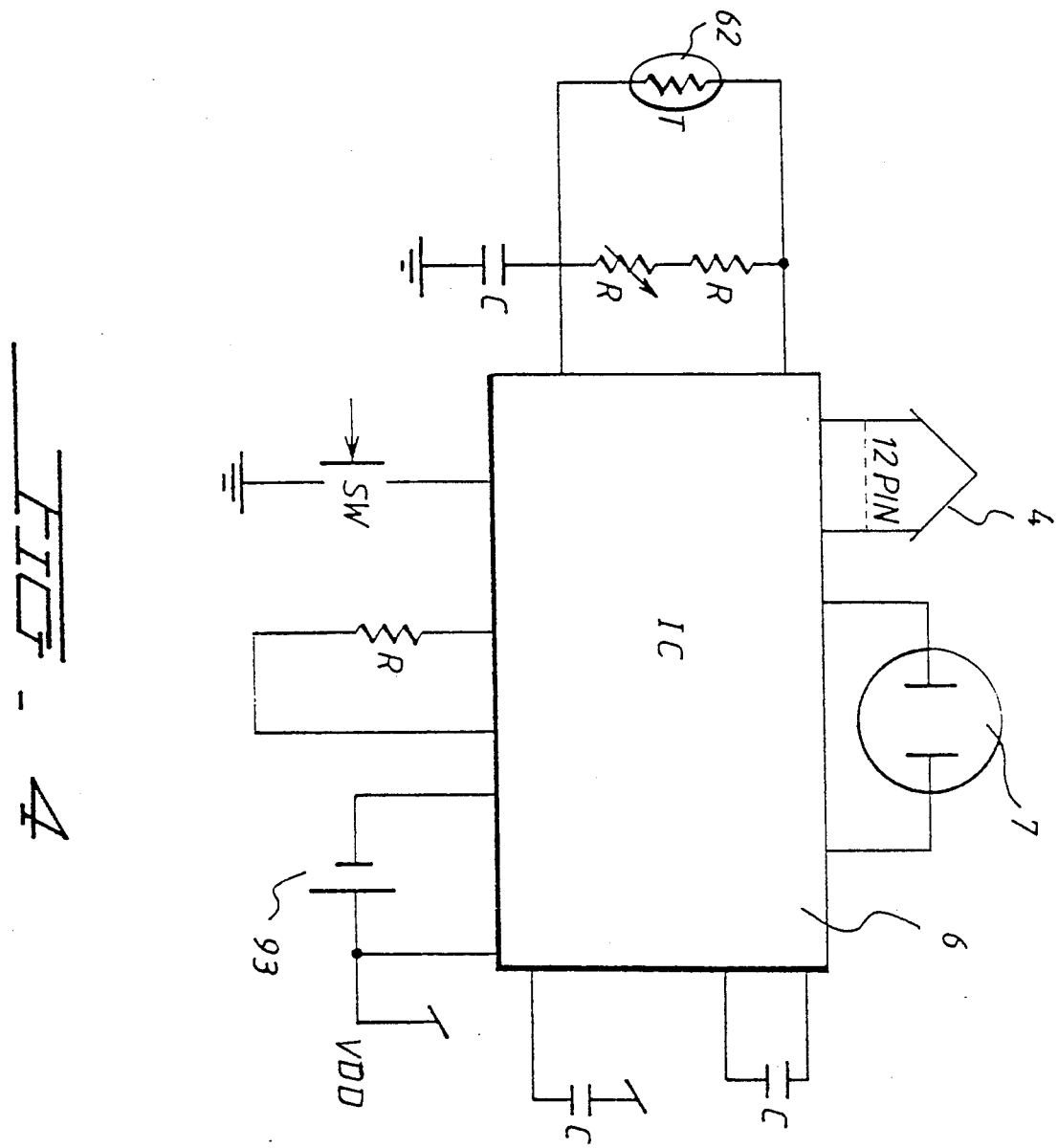
FIG. 4 is a schematic view showing the circuit used in the assembly in accordance with the invention.

A liquid 12 of good heat conductivity can be filled within the sealed space defined by the base 1, the main case 2, the protection housing 61, and the rubber sheet 3 so that heat can be transferred from the mouth of the baby through the nipple 11 of the base 1 to the liquid 12 within the nipple 11. When the nipple 11 is sucked and pressed by the baby's mouth, the liquid therein will flow convectively in the sealed space and thus the heat in the liquid can be transferred to the heat sensitive resistor 62 which in turn sends a signal corresponding to the temperature of the liquid to the IC board 6. The board 6 then sends a converted signal to the LCD 4 and the latter displays the numerals representing the temperature. Futhermore, when the heat conductive liquid 12 reaches a predetermined warning temperature, a signal from the heat sensitive resistor 62 will be sent through the IC board 6 to the alarm buzzer 7. Thus, the buzzer 7 is energized and issues a sound through the sound releasing openings 81 in the convex housing 8 to attract the attention of the person who cares for the baby. The circuit in accordance with the invention is schematically shown in FIG. 4.

While only one preferred embodiment of the invention has been shown and described, it will be understood that this invention is not limited thereto since modifications can be made and will become apparent to those skilled in the art.

I claim

1. A nipple assembly comprising:
   a) a nipple base;
   b) a main case receivable within the nipple base, the main case including an open end, a closed end, a central hole formed in the closed end and defined by a hollow cylindrical member extending towards the open end and terminating in a circular flange, a plurality of glue pits circumferentially spaced around the periphery of the main case for receiving waterproof glue to secure the main case to the nipple base;
   c) a protection housing secured within the hollow cylindrical member;
   d) a heat sensitive resistor disposed within the protection housing, and a rubber sheet secured to the protection housing and the circular flange;
   e) an LCD, an IC boards and an alarm buzzer disposed within the main case;
   f) a decorative plate secured to the open end of the main case, the decorative plate being sufficiently acoustically transparent for permitting sound from the alarm buzzer to pass therethrough, and including a viewing window through which the LCD may be observed;
   g) a transparent convex housing secured to the decorative plate and including means for permitting the alarm sound to be transmitted therethrough;
   h) a handle provided with a battery therein for energizing the alarm buzzer;
   i) a heat conductive liquid within the main case; and
   j) wherein the temperature of a baby's mouth on the nipple base is transferred through the heat conductive liquid to the heat sensitive resistor for transmitting a signal from the resistor to the IC board for operating the LCD to provide a display corresponding to the temperature of the baby's body, and when the conductive liquid reaches a predetermined temperature, a signal from the heat sensitive resistor is transmitted through the IC board to energize the alarm buzzer and attract the attention of a person caring for the baby.

* * * * *